United States Patent
Ji

(10) Patent No.: US 11,163,316 B2
(45) Date of Patent: Nov. 2, 2021

(54) APPARATUS FOR CONTROLLING GROUP DRIVING AND METHOD THEREOF

(71) Applicant: HYUNDAI MOBIS CO., LTD., Seoul (KR)

(72) Inventor: Yong Kwan Ji, Seoul (KR)

(73) Assignee: HYUNDAI MOBIS CO., LTD., Seoul (KR)

(*) Notice: Subject to any disclaimer, the term of this patent is extended or adjusted under 35 U.S.C. 154(b) by 392 days.

(21) Appl. No.: 16/215,516

(22) Filed: Dec. 10, 2018

(65) Prior Publication Data
US 2019/0179337 A1    Jun. 13, 2019

(30) Foreign Application Priority Data
Dec. 8, 2017 (KR) .................. 10-2017-0168191

(51) Int. Cl.
G05D 1/02 (2020.01)
G06N 20/00 (2019.01)
G05D 1/00 (2006.01)

(52) U.S. Cl.
CPC ......... *G05D 1/0291* (2013.01); *G05D 1/0088* (2013.01); *G06N 20/00* (2019.01); *G05D 2201/0213* (2013.01)

(58) Field of Classification Search
CPC ............ G05D 1/0291; G05D 1/0088; G05D 2201/0213; G06N 20/00
See application file for complete search history.

(56) References Cited

U.S. PATENT DOCUMENTS

2010/0256852 A1* 10/2010 Mudalige ............... G08G 1/22
  701/24
2014/0309836 A1* 10/2014 Ollis ...................... G01C 21/00
  701/25
2017/0329348 A1* 11/2017 Li ......................... G05D 1/0212
(Continued)

FOREIGN PATENT DOCUMENTS

JP     2000-348300 A    12/2000
JP     2009-18623 A      1/2009
(Continued)

OTHER PUBLICATIONS

Office Action of Korean Patent Application No. 10-2017-0168191—8 pages (dated Feb. 22, 2021).

*Primary Examiner* — Behrang Badii
(74) *Attorney, Agent, or Firm* — NSIP Law

(57) ABSTRACT

The apparatus for controlling group driving according to as aspect may include an inter-vehicle communication unit for communicating with a leader vehicle to receive the driving state and traveling track of the leader vehicle, a leader vehicle learning unit for learning a driving pattern of the leader vehicle based on the driving state of the leader vehicle received through the inter-vehicle communication unit, an autonomous drive unit for autonomously driving the follower vehicle in accordance with the traveling track of the leader vehicle, and a follow-up control unit for receiving the driving state of the leader vehicle to learn the driving pattern of the leader vehicle, controlling the autonomous drive unit to follow the traveling track of the leader vehicle, and performing the autonomous driving by applying the driving pattern of the leader vehicle.

10 Claims, 11 Drawing Sheets

(56) References Cited

U.S. PATENT DOCUMENTS

2018/0225975 A1\* 8/2018 Park .................. G08G 1/052
2019/0054920 A1\* 2/2019 Karlsson ............. B60W 30/165

FOREIGN PATENT DOCUMENTS

| JP | 2014-75049 A | 4/2014 |
|----|--------------|--------|
| KR | 10-0957137 B1 | 5/2010 |
| KR | 10-2017-0016177 A | 2/2017 |

\* cited by examiner

APPARATUS FOR CONTROLLING GROUP DRIVING AND METHOD THEREOF

CROSS-REFERENCES TO RELATED APPLICATIONS

The present application claims priority to Korean application number 10-2017-0168191, filed on Dec. 8, 2017, which is incorporated by reference in its entirety.

BACKGROUND OF THE INVENTION

The present invention relates to an apparatus for controlling group driving and a method thereof, and more particularly, to an apparatus and a method for controlling the group driving, which enable a follower vehicle to follow a leader vehicle based on the driving patterns of the leader vehicle learned during the group follow-up driving to maintain a group driving in a case where the follower vehicle deviates from the group driving.

Generally, the group driving means that a plurality of vehicles grouped into one group share traveling information with each other and travel on the road while considering the external environment.

One group includes a leader vehicle and follower vehicles. The leader vehicle is the vehicle that leads the group at the head of the group, and the follower vehicles are the vehicles that follow the leader vehicle.

The follower vehicles of the group can keep follow-up to the leader vehicle by using traveling information of the leader vehicle (for example, GPS coordinates, speed, route, direction, and brake information) transmitted through an inter-vehicle communication method or the like. Accordingly, the driver of the follower vehicle can freely perform other actions (for example, smartphone operation, sleeping) other than driving inside the vehicle. Such group driving increases the convenience of the driver and improves the transportation efficiency.

The follower vehicle may fail to follow the leader vehicle and depart from the group during the group driving depending on the state of the road and the traffic congestion state. In this case, when the follower vehicle follows the leader vehicle and wants to keep the group driving, there is a problem that it is difficult to keep the group driving again when the autonomous drive is performed based on the normal driving pattern.

SUMMARY OF THE INVENTION

The present invention has been made in order to solve the above-mentioned problem, and embodiments of the present invention provide an apparatus and a method for controlling group driving, which enable a follow vehicle to follow a leader vehicle based on a driving pattern of the leader vehicle learned during the group driving and keep the group driving when the follower vehicles of the group deviates from the group driving.

The apparatus for controlling group driving according to an aspect of the present invention may include an inter-vehicle communication unit for communicating with a leader vehicle to receive the driving state and traveling track of the leader vehicle, a leader vehicle learning unit for learning a driving pattern of the leader vehicle based on the driving state of the leader vehicle received through the inter-vehicle communication unit, an autonomous drive unit for autonomously driving the follower vehicle in accordance with the traveling track of the leader vehicle, and a follow-up control unit for receiving the driving state of the leader vehicle to learn the driving pattern of the leader vehicle, controlling the autonomous drive unit to follow the traveling track of the leader vehicle, and performing the autonomous driving by applying the driving pattern of the leader vehicle.

The apparatus may further include a storage for storing the driving state and the traveling track of the leader vehicle received from the leader vehicle and the driving pattern of the leader vehicle.

The driving state of the leader vehicle may include at least one of lane change timing, an entry steer angle and an entry speed in accordance with type and situation of the road in the leader vehicle.

The follow-up control unit may perform autonomous driving so that the follower vehicle joins the group driving by applying the driving pattern of the leader vehicle when the follower vehicle deviates from the group driving.

A method of controlling group driving according to another aspect of the present invention may include: performing, by a follow-up control unit, group driving through an autonomous drive unit according to a traveling track received from a leader vehicle; receiving, by the follow-up control unit, a driving state of the leader vehicle from the leader vehicle during the group driving to learn a driving pattern of the leader vehicle; and performing, by the follow-up control unit, autonomous driving by applying the driving pattern of the leader vehicle.

The driving state of the leader vehicle may include at least one of lane change timing, an entry steer angle and an entry speed in accordance with the type and situation of the road in the leader vehicle.

The method may further include: storing, by the follow-up control unit, the traveling track and the driving state of the leader vehicle received from the leader vehicle and the driving pattern of the leader vehicle in a storage.

In performing autonomous driving, the follow-up control unit determines whether the follower vehicle has deviated from the group driving and performs the autonomous driving so that the follower vehicle joins the group driving by applying the driving pattern of the leader vehicle.

DESCRIPTION OF SPECIFIC EMBODIMENTS

Hereafter, an apparatus and a method for controlling group driving in accordance with an embodiment of the present invention will be described in detail with reference to the accompanying drawings. It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

Figure 1:
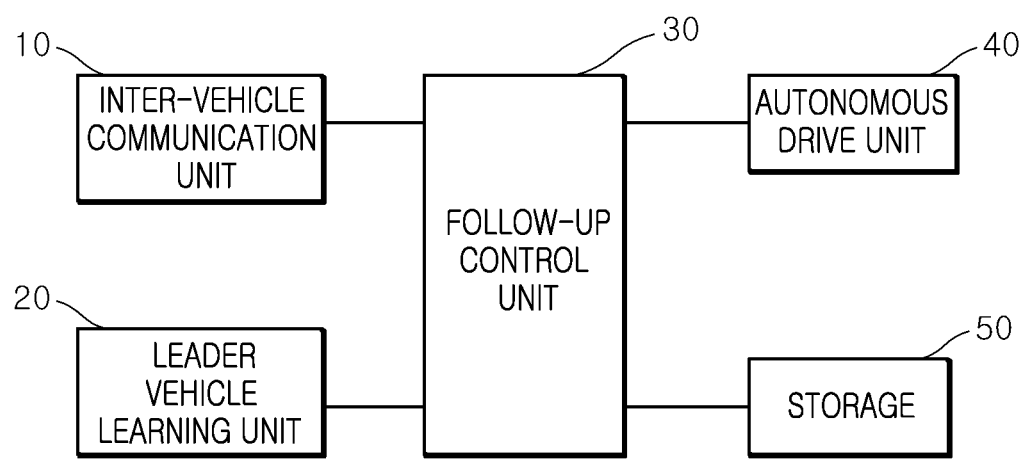
FIG. 1 is a block diagram illustrating an apparatus for controlling group driving according to an embodiment of the present invention.

FIG. 1 is a block diagram illustrating an apparatus for controlling group driving according to an embodiment of the present invention.

As illustrated in FIG. 1, the apparatus for controlling group driving according to an embodiment of the present invention may include an inter-vehicle communication unit 10, a leader vehicle learning unit 20, an autonomous drive unit 40, a follow-up control unit 30, and a storage 50.

As is traditional in the corresponding field, some exemplary embodiments may be illustrated in the drawings in terms of functional blocks, units, and/or modules. Those of ordinary skill in the art will appreciate that these block, units, and/or modules are physically implemented by electronic (or optical) circuits such as logic circuits, discrete components, processors, hard-wired circuits, memory elements, wiring connections, and the like. When the blocks, units, and/or modules are implemented by processors or similar hardware, they may be programmed and controlled using software (e.g., code) to perform various functions discussed herein. Alternatively, each block, unit, and/or module may be implemented by dedicated hardware or as a combination of dedicated hardware to perform some functions and a processor (e.g., one or more programmed processors and associated circuitry) to perform other functions. Each block, unit, and/or module of some exemplary embodiments may be physically separated into two or more interacting and discrete blocks, units, and/or modules without departing from the scope of the inventive concept. Further, blocks, units, and/or module of some exemplary embodiments may be physically combined into more complex blocks, units, and/or modules without departing from the scope of the inventive concept.

The inter-vehicle communication unit 10 may communicate with the leader vehicle based on the V2X (Vehicle to Everything) communication technology and receive the driving state and traveling track of the leader vehicle.

The V2X communication technology is a technology that can connect the vehicle to external objects including road infrastructure (V2I) and pedestrians (V2P) as well as communication between vehicles (V2V) by installing communication function in the vehicle. To this end, the inter-vehicle communication unit 10 may include configurations such as a processor, a memory, a decoder, an encoder, an antenna and the like to perform the communication function.

The storage 50 may store the driving pattern of the leader vehicle as well as the driving state and traveling track of the leader vehicle received from the leader vehicle. The storage 50 may be a storage device such as a memory.

The leader vehicle learning unit 20, the follow-up control unit 30 and the autonomous drive unit 40 may include processors physically implemented by electronic (or optical) circuits such as logic circuits, discrete components, processors, hard wired circuits, memory devices and interconnections to perform data processing.

The leader vehicle learning unit 20 may learn the driving pattern of the leader vehicle based on the driving state of the leader vehicle, received through the inter-vehicle communication unit 10. Here, the driving state of the leader vehicle may include lane change timing, an entry steer angle, and an entry speed depending on the road type and the situation in the leader vehicle.

That is, if the steering angle of the leader vehicle suddenly changes to a predetermined range or more or when the steering angle is inputted in the direction of operation of the turn signal lamp, it is determined as the lane changing timing, so that the steering angle at the time of changing lane can be determined and provided as an entry steering angle and the speed at the time of changing the lane can be determined and provided as the entry speed.

Further, the road type and situation at the time of lane changing are also provided together, so that road curvature is analyzed according to road type and situation, and lane change rate and changing timing are analyzed to learn the driving pattern.

Accordingly, the leader vehicle learning unit 20 may learn the driving pattern of the leader vehicle based on the driving state inputted from the leader vehicle and apply the driving pattern of the leader vehicle during the follow-up driving.

The autonomous drive unit 40 may enable the follower vehicle to autonomously drive in accordance with the travel track of the leader vehicle to perform follow-up driving.

To this end, the autonomous drive unit 40 may include a front camera, a rear camera and an ultrasonic sensor for sensing the front, rear and periphery of the vehicle, uses high-precision map information to analyze the situation of the traveling road such as the shape and width of the road, the number of line, the curvature, the uphill and downhill angle and the like and the traffic congestion, and outputs a control signal to perform engine control, braking control and steering control, thereby performing autonomous traveling of the vehicle.

The follow-up control unit 30 may receive the driving state of the leader vehicle to learn the driving pattern of the leader vehicle, control the autonomous drive unit 40 to follow the traveling track of the leader vehicle, and apply the driving pattern of the leader vehicle to perform autonomous driving.

That is, the follow-up control unit 30 may receive the traveling track from the leader vehicle of the group driving through the inter-vehicle communication unit 10 to store it in the storage 50, and perform group follow-up driving through the autonomous drive unit 40 to follow the traveling track, thereby maintaining the group driving.

At this time, the follow-up control unit 30 may receive the driving state of the leader vehicle from the leader vehicle and learn the driving pattern of the leader vehicle, so that the lane change can be performed by applying the driving pattern of the leader vehicle when performing follow-up driving.

In addition, when the distance from the leader vehicle is longer than the preset distance, the follow-up control unit 30 may apply the operation pattern of the leader vehicle to the follower vehicle so that the follower vehicle can join the group driving with the leader vehicle more quickly.

As described above, according to the apparatus for controlling group driving of the embodiment of the present invention, when the follower vehicle of the group driving deviates from the group driving, the follower vehicle follows the leader vehicle based on the driving pattern of the leader vehicle, which is learned during the group follow-up driving. Accordingly, even if the road shape and situation change, the follow-up performance of the leader vehicle can be improved to reduce the deviation from the group driving, and the joining time can be reduced when departed from the group driving.

Figure 2:
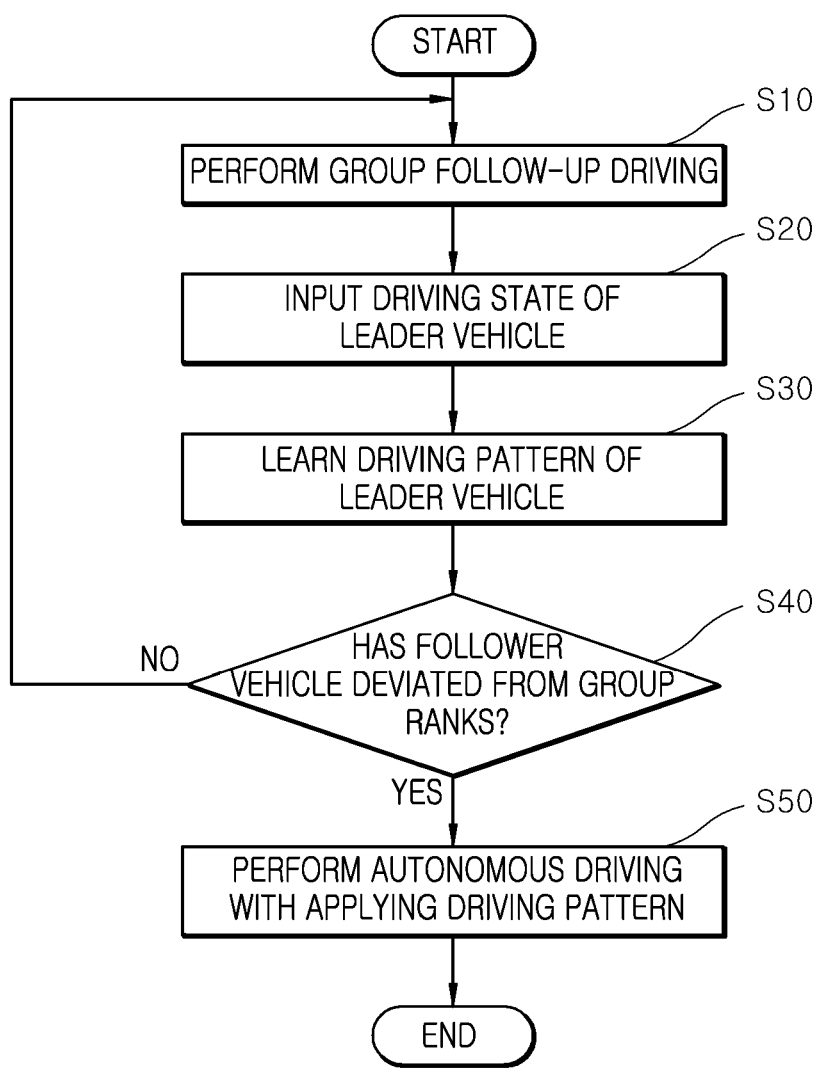
FIG. 2 is a flow chart illustrating a method of controlling group driving according to an embodiment of the present invention.

FIG. 2 is a flow chart illustrating a method of controlling group driving according to an embodiment of the present invention.

As illustrated in FIG. 2, in the method of controlling group driving according to the embodiment of the present invention, first, the follow-up control unit 30 may receive the traveling track through the inter-vehicle communication unit 10 from the leader vehicle traveling in the group, and perform group follow-up driving through the autonomous drive unit 40 (S10).

At this time, the follow-up control unit 30 may store the received traveling track in the storage 50.

The follow-up control unit 30 may receive the driving state of the leader vehicle from the leader vehicle through the inter-vehicle communication unit 10 and store the received driving state of the leader vehicle in the storage 50 (S20), while performing the group follow-up driving in step S10. Here, the driving state of the leader vehicle may include lane change timing, an entry steer angle, and an entry speed depending on the type and situation of the road in the leader vehicle.

That is, when the steering angle suddenly changes to a predetermined range or more or the steering angle is input in the direction of operation of the turn signal lamp in the leader vehicle, it is determined as the lane change timing, so that the steering angle at the time of changing lane can be determined and provided as an entry steering angle and the speed at the time of changing lane can be determined and provided as the entry speed.

Further, the road shape and condition are provided together when changing lanes, so that the road curvature can be analyzed according to the road shape and condition and the lane change rate and change timing can be analyzed to learn driving pattern.

After receiving the driving state of the leader vehicle in step S20, the follow-up control unit 30 may learn the driving pattern of the leader vehicle based on the driving state inputted from the leader vehicle through the leader vehicle learning unit 20, so that the driving pattern of the leader vehicle can be applied in the time of follow-up driving (S30).

In this way, the follow-up control unit 30 may learn the driving pattern of the leader vehicle by receiving the driving state from the leader vehicle while performing the group follow-up driving to maintain the group driving and store the driving pattern in the storage 50.

At this time, the follow-up control unit 30 can improve the follow-up performance of the leader vehicle by applying the driving pattern of the leader vehicle while performing the autonomous traveling to follow the leader vehicle through the autonomous drive unit.

The follow-up control unit 30 may determine whether the distance from the leader vehicle is greater than a preset distance and the follower vehicle deviates from the group driving (S40).

If it is determined that the follower vehicle has not deviate from the group driving in step S40 and maintains the group driving, the follow-up control unit 30 may return to step S10 and continue to control so that the follower vehicle maintains the group driving and performs the group follow-up driving.

On the other hand, if it is determined that the follower vehicle has deviated from the group driving in step S40, the follow-up control unit 30 may perform the autonomous driving so that follower vehicle can join the group driving more quickly by applying the driving pattern of the leader vehicle stored in the storage 50 (S50).

As described above, it can be determined that the distance between the leader vehicle and the follower vehicle which are traveling in a group is greater than the preset distance by the driver of the leader vehicle traveling while changing the lane in a good way in the situation of the traveling road.

Therefore, when the follower vehicle learns the driving pattern of the leader vehicle to perform follow-up driving such as lane changing or when the follower vehicle departs from the group driving, the follow-up control unit 30 may apply the driving pattern of the leader vehicle so that the follower vehicle can cope with the type and condition of the traveling road well to join the group driving more quickly.

As described above, according to the method of controlling group driving of the embodiment of the present invention, when the follower vehicle of the group driving deviates from the group driving, the follower vehicle follows the leader vehicle based on the driving pattern of the leader vehicle, which is learned during the group follow-up driving. Therefore, the follow-up performance of the leader vehicle can be improved to reduce the deviation of the follower vehicle from the group driving and the joining time can also be reduced when the follower vehicle deviates from the group driving, even if the type and situation of the road change.

On the other hand, in the other embodiment of the present invention, apparatus for controlling group driving may further include user interface and driver status sensors.

The user interface may be a display installed on a vehicle, and if the vehicle joins a group driving, it will display information about the joining point of the group driving, and the joining point of the group driving can be selected by the driver and entered into the follow-up control unit 30. Where, information about the joining points may include the location of the joining points, distance from the location of the vehicle to the joining point, traffic situation information at the joining point, and etc.

The user interface guides the exit points before the vehicle arrives at the destination.

In addition, the user interface provides various information to the driver when the vehicle joins and leaves the group driving. And the user interface receives various control commands from the driver, and provides the driver with a group-related user interface.

The driver status sensors detect the driver's condition of the vehicle. The driver status sensors include a voice sensor that detects the driver's voice, an image sensor that captures the driver, and a biometric sensor that detects the driver's biological signal.

The driver's voice detected by the voice sensors can be used to determine if the driver is currently asleep.

The driver's face or eyes captured by an image sensor can be used to determine if the driver is currently looking forward and whether the driver is asleep.

Biometric signal sensors detect driver's biological signals, which may include ECG, brainwave, pulse, and blood flow. In addition, biometric sensors can detect a variety of driver signals and are not limited to the above ECG, brainwave, pulse and blood flow. Biometric signals are the basis for the driver to determine if he is currently asleep or has experienced health problems.

Here, the driver's status information is intended to detect the driver's biological signal, but its location or manner is not specifically limited.

The follow-up control unit 30 detects the driver's condition and determines whether leaving the group driving, when starting a group driving.

The follow-up control unit 30 determines that leaving from the group driving when the driver's condition satisfies the predetermined exit condition.

The exit condition is a condition that is the basis for determining whether to leave the group driving or not. The exit condition shall be explained later.

If the vehicle is a leader vehicle, the follow-up control unit 30 gives the leader vehicle authority to the vehicle before leaving the group driving.

If the follow-up control unit 30 leaves from the group driving, it performs driving control to the safety zone or medical institution, and also sends driver status information to the medical institution server for quick action.

Moreover, the follow-up control unit 30 of the leader vehicle collects driver status information from the follower vehicles. And the follow-up control unit 30 analyzes the driver status information collected from each of these follower vehicles and determines the group order of follower vehicles according to the analysis.

That is, the follow-up control unit 30 of the leader vehicle may determine the group queue sequence based on digitized driver status information by digitizing the driver status information received from each follower vehicle.

In other words, the follow-up control unit 30 of the leader vehicle requests driver status information from the follower vehicles, and the follow-up control unit 30 of follower vehicles transmit the driver status information detected by the driver status sensors as shown above.

As driver status information is collected from each follower vehicle, the follow-up control unit 30 of the leader vehicle analyzes the driver status information and determines the group sequence of the follower vehicles according to the analysis results.

In this case, the follow-up control unit 30 of the leader vehicle may digitize the driver status information of each follower vehicle and compare these driver status values to place the vehicles.

Here, the driver's status value can be either a measurement of the ECG, brainwave, pulse or blood flow, or a set value corresponding to these ECG, brainwave, pulse or blood flow measurements.

Moreover, the driver's status values may be the average value of the corresponding settings for each ECG, brainwave, pulse, or blood flow. In this case, the driver's condition values can be calculated by weighting the ECG, brainwave, pulse, pulse, or blood flow depending on the degree to which they interfere with the operation or their criticality.

In this regard, if the follow-up control unit 30 of the leader vehicle determines the order of group driving of follower vehicles according to the driver's status values, the follow-up control unit 30 controls the follower vehicles in accordance with the determined group sequence.

That is, the follow-up control unit 30 of the leader vehicle communicates the driving information for group driving to each follower vehicle, and the follow-up control unit 30 of each follower vehicle controls the autonomous drive unit 40 according the driving information to follow up the leader vehicle.

Meanwhile, in the process of group driving, each of the leader and follower vehicles may exit from group driving depending on the driver's condition.

In the process of group driving the follow-up control units 30 of the leader vehicle and the follower vehicles respectively detect the driver status.

In this case, each of the following control units 30 of the leader vehicle and the follower vehicles determine that the driver status satisfies the predetermined exit conditions. And each of the following control units 30 of the leader vehicle and the follower vehicles determine whether leaving from the group driving according to the determination.

In other words, the following control units 30 of the leader vehicle and the follower vehicles generate a driver status value by digitizing the driver status information and comparing it to the threshold value.

The threshold values are the criteria for determining that a driver's health condition is abnormal and can vary depending on the driver's condition values listed above.

The following control units 30 of the leader vehicle and the follower vehicles perform leaving the group driving when the driver status value below the threshold. In that case, the following control units 30 of the leader vehicle and the follower vehicles transmits the driver status information to the medical institution server, and controls the autonomous drive unit 40 to drive the vehicle to the safety area or the medical institution.

Here, if the vehicle is a leader, the follow-up control unit 30 gives the leader vehicle authority to the primary follower vehicle before leaving from the group driving.

In addition, if one or more of the follower vehicles leave from the group driving, the follow-up control unit 30 of leader vehicle continuously performs group driving by adjusting the group sequence.

As such, the method and apparatus for controlling group driving according to this embodiment of the present invention is to analyze the driver's condition during group driving and let out one or more vehicles from group driving according to the analysis result.

In addition, this embodiment of the present invention allows drivers to obtain medical services by leaving the group driving if the condition of the driver becomes abnormal during the group driving.

In another embodiment of the present invention, the follow-up control unit 30 of the leader vehicle determines whether there is a vehicle which does not belong to the driving group.

Figure 3:
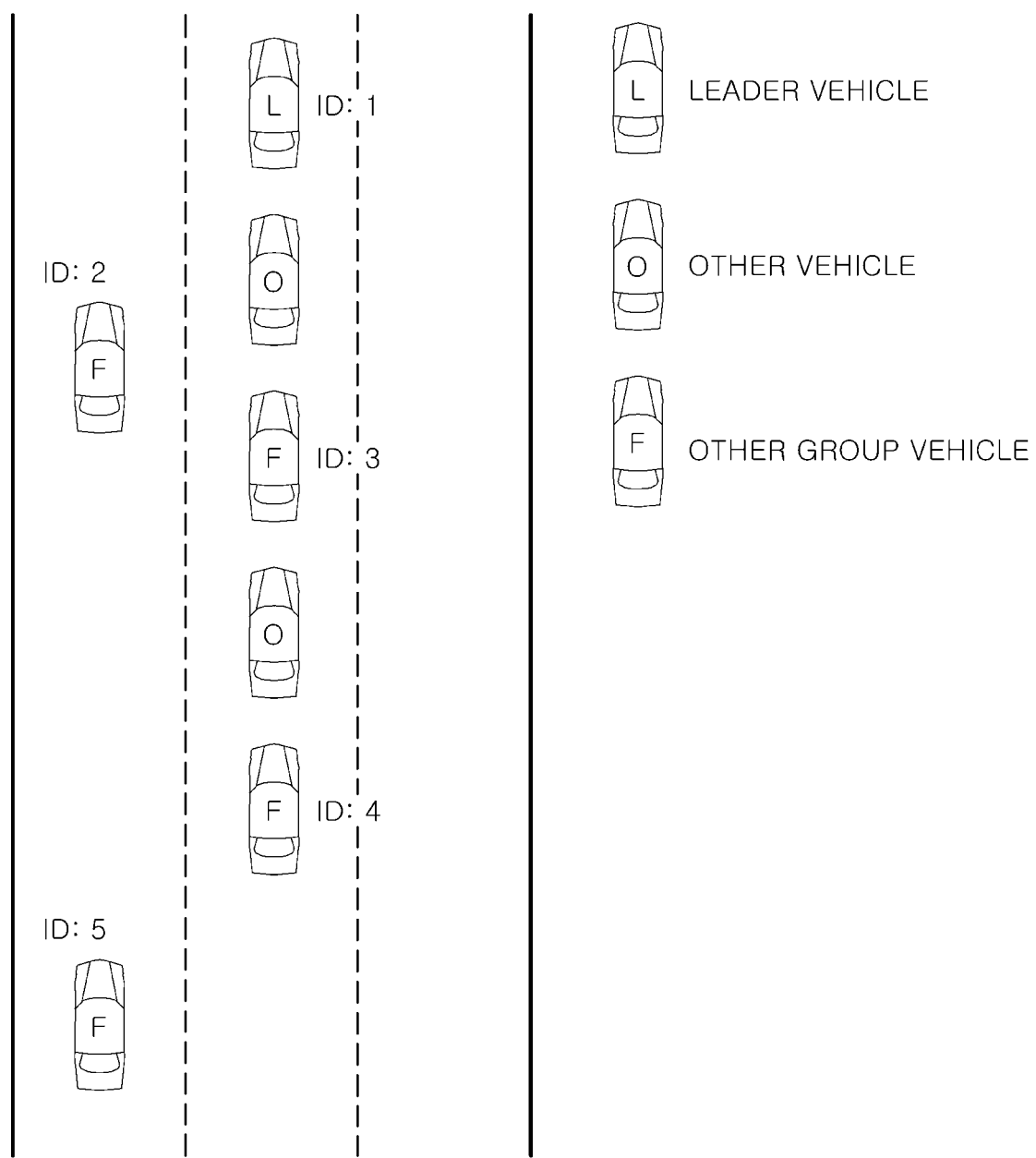
FIGS. 3-11 are views showing group driving.

The follow-up control unit 30 of the leader vehicle detects vehicles including the driving group using sensors (crash sensor, steering sensor, speed sensor, inclination sensor, weight sensor, yaw rate sensor, gyro sensor and etc). And the follow-up control unit 30 of the leader vehicle determines whether a vehicle with no approval of the leader vehicle (i.e., not joined to the group driving) is present in the driving group If a vehicle with no approval of the leader vehicle is found in a driving group as illustrated in FIG. 3, the leader vehicle is given an identification code (ID) that has sequential values according to the distance from the leader vehicle.

Here, other group vehicle is defined as a group vehicle that belongs to the driving group of the leader vehicle and is distinguished from the leader vehicle. The leader vehicle also gives itself an identification code. The identification code given to a group vehicle serves as the basis for maintaining the order alignment of a group vehicle in group driving, and thus prevents the vehicle release due to movement of the group vehicle at the time of the group driving.

The leader vehicle is then moved to the target lane and then transferred to another group vehicle belonging to the driving group. The target lane is the target for the maintenance of the order of the group vehicles. The leader vehicle can be moved to the target lane (the current driving lane or the adjacent lane). Then, the target lane information is transmitted to the other group vehicles so that the other group vehicles can move to the target lane.

Figure 4:
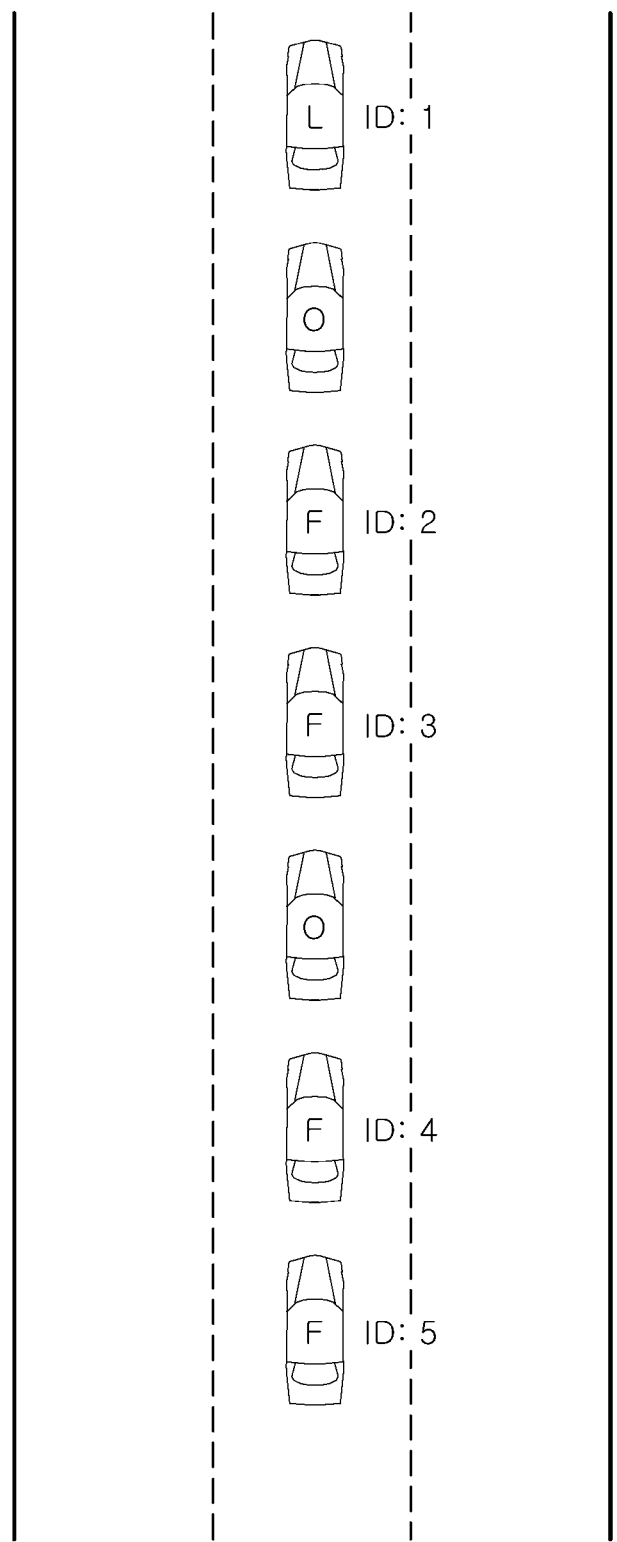

Subsequently, the other group vehicles move to the target lane according to the received information. Other group vehicles are moved to the target lane while maintaining the order alignment according to the identification code as illustrated in FIG. 4. As a result, in the course of moving to the target lane, other group vehicles can maintain each order alignment, thus preventing disassembly.

Subsequently, after the other group vehicles moved to the target lane, the first group vehicle belonging to the first driving group among the plurality of groups separated and formed by the other vehicle joins the second driving group.

Here, the first driving group and the second driving group are determined based on the number of group vehicles belonging to each driving group. Specifically, the first driving group and the second driving group are determined such that the number of the first group vehicles belonging to the first driving group is smaller than the number of the second group vehicle belonging to the second driving group. If the number of the first group vehicles is equal to the number of the second group vehicles, the first driving group is determined to be a driving group driving in front of the second driving group. That is, the forward driving group is determined as the first driving group and the rear driving group is determined as the second driving group when the number of the group vehicles belonging to each driving group is the same.

The last vehicle of the second group vehicle belonging to the second driving group decelerates to secure a space with the forward group vehicles and the first group vehicles joins the second driving group through the space.

This process will be specifically described as an example shown in FIGS. 5 to 8.

Figure 5:
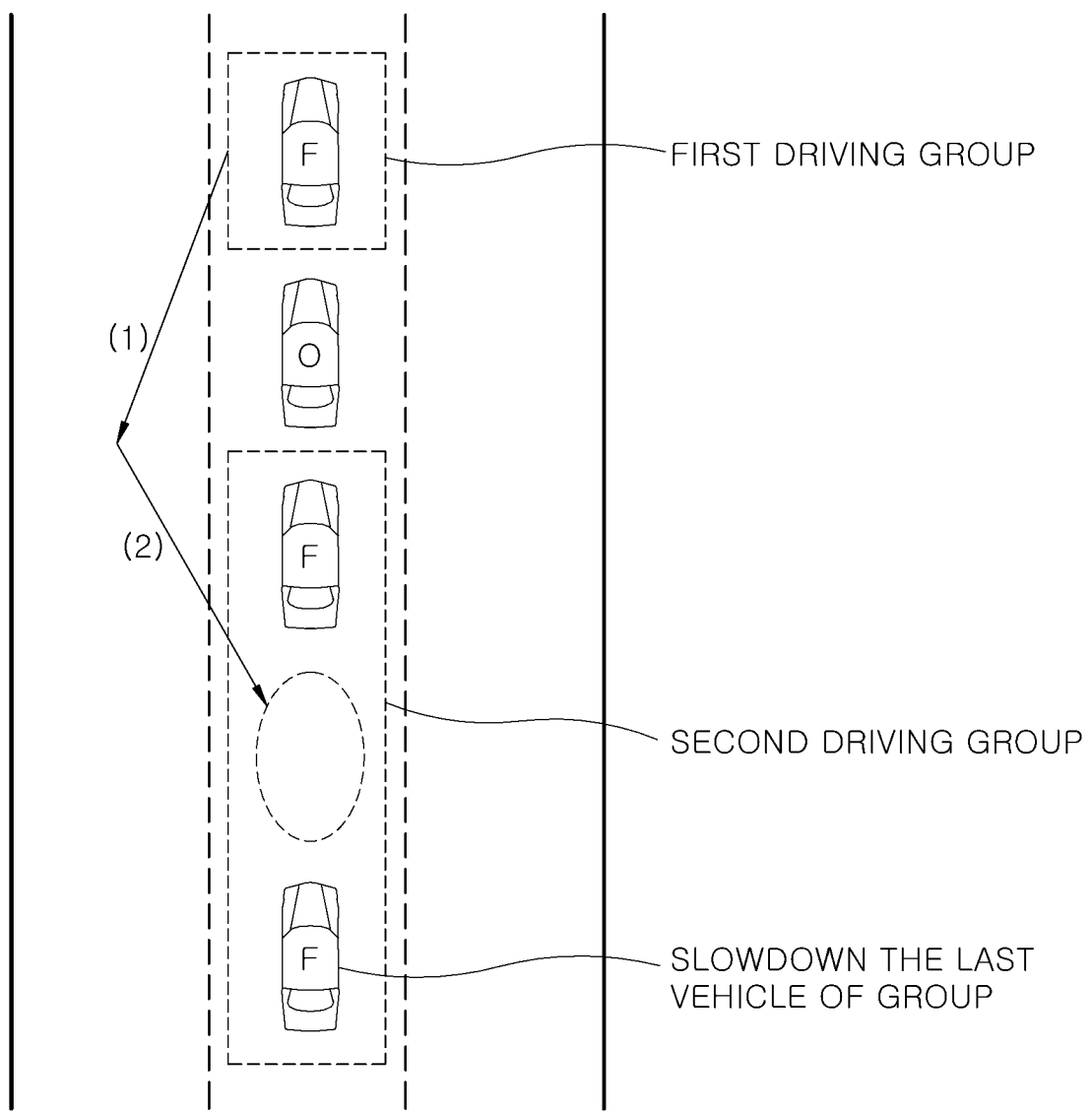

Referring to FIG. 5, the driving group is divided into two driving groups by the other vehicle. The number of the group vehicles belonging to the forward travel group is one and the number of the group vehicles belonging to the rearward travel group is two so that the forward travel group becomes the first travel group and the rear travel group becomes the second travel group. The first group vehicle joins the second travel group to maintain the efficiency of the row. At this time, the last group vehicle of the second group vehicle decelerates to secure a space with the preceding vehicle, and the first group vehicle joins the second travel group through the secured space.

Figure 6:
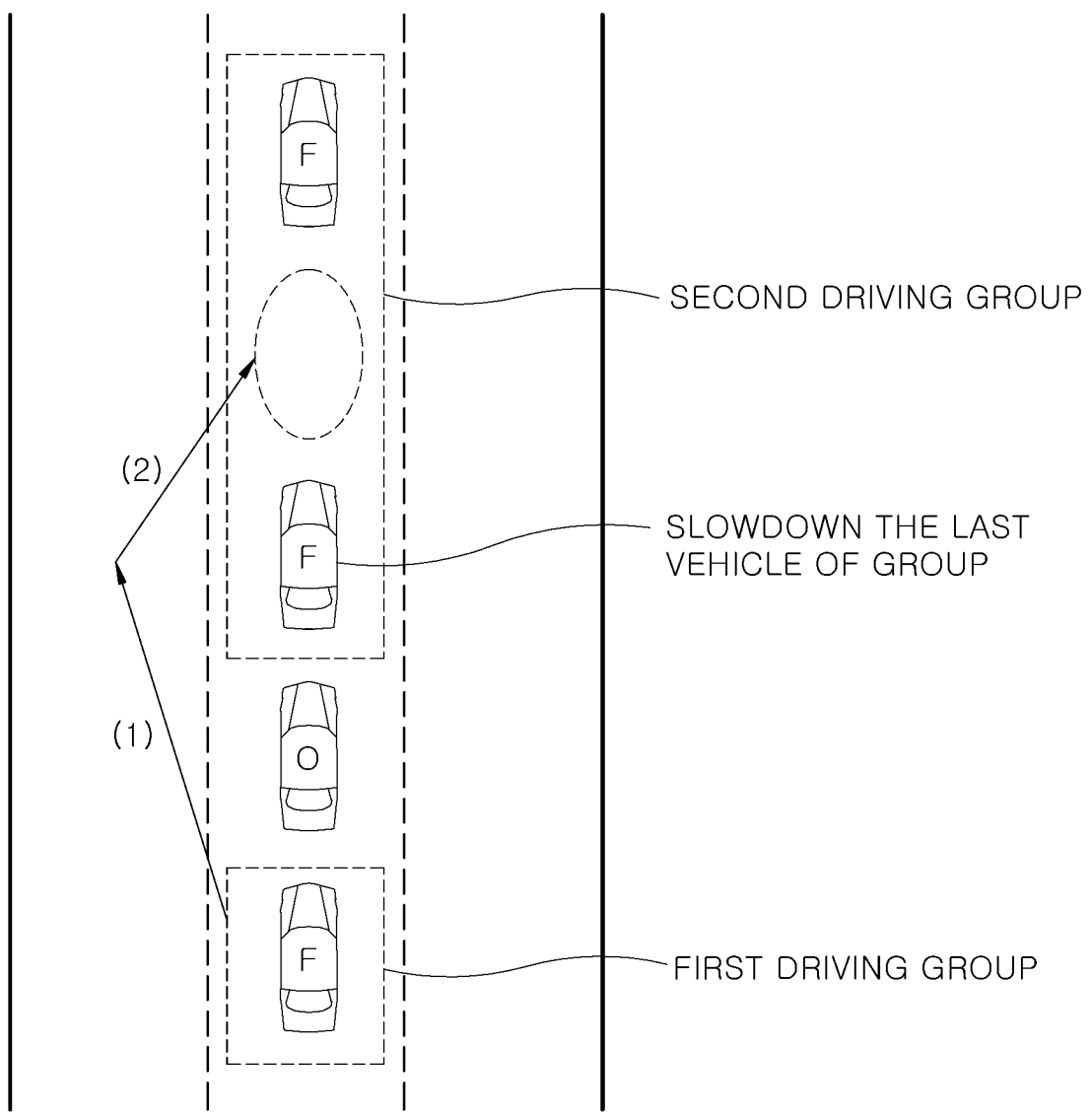

Referring to FIG. 6, the driving group is divided into two driving groups by the other vehicle. Since the number of group vehicles belonging to the forward driving group is two and the number of the community vehicles belonging to the rear driving group is one, it is determined that the rearward driving group is the first driving group and the forward driving group is the second driving group. And the first group vehicle joins the second driving group for the efficiency of the row maintenance. At this time, the last group vehicle of the second group vehicles decelerates to secure a space with the preceding vehicle, and the first group vehicle joins the second driving group through the space.

Figure 7:
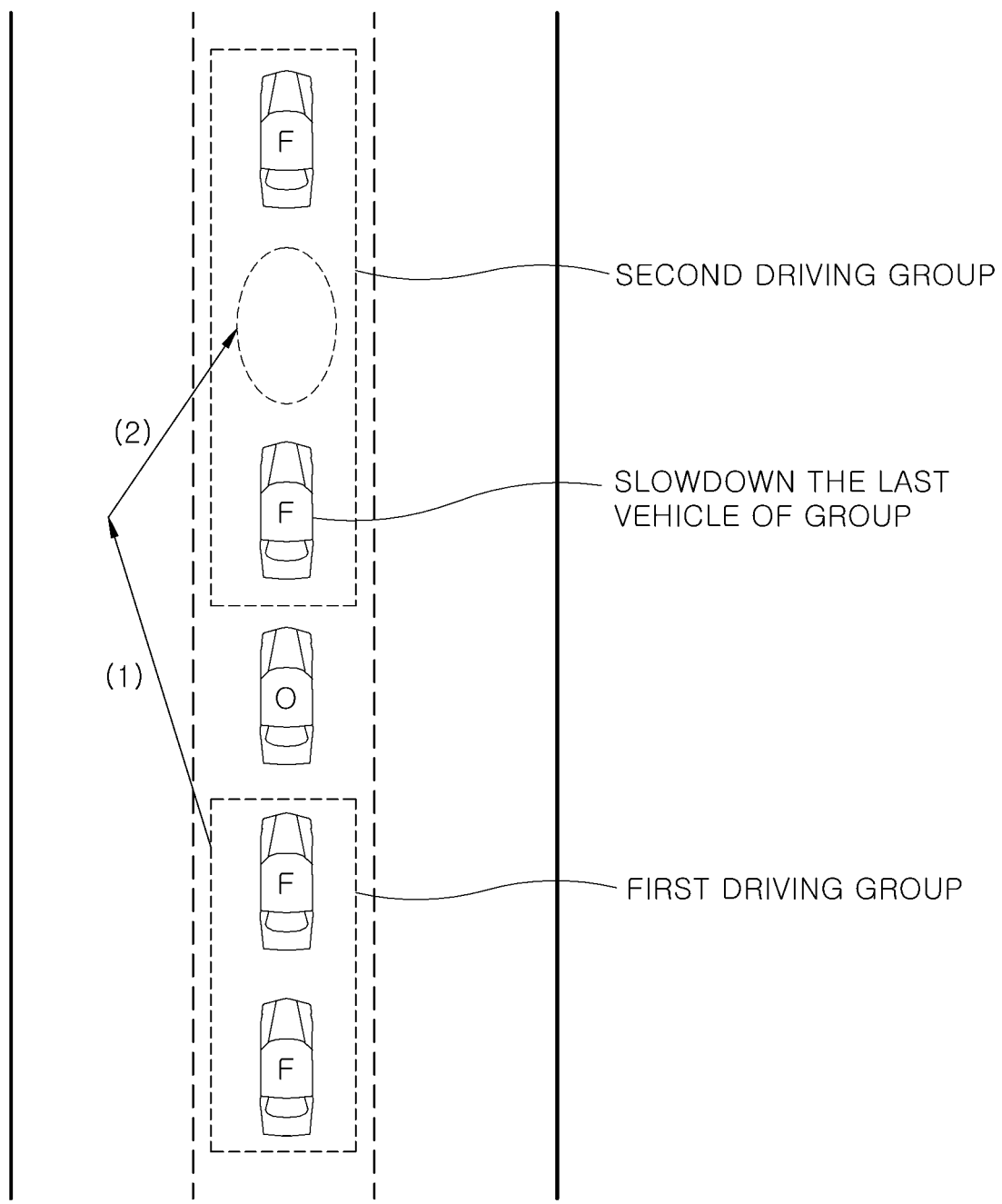

Referring to FIG. 7, the driving group is divided into two driving groups by the other vehicle. The number of the group vehicles belonging to the forward driving group is three and the number of the group vehicles belonging to the rear driving group is two so that the rear driving group is the first driving group and the forward driving group is the second driving group. And the first group vehicles joins the second driving group for the efficiency of the row maintenance. At this time, the last group vehicle of the second group vehicles decelerates to secure a space with the preceding vehicle, and the first group vehicles joins the second driving group through the space.

Figure 8:
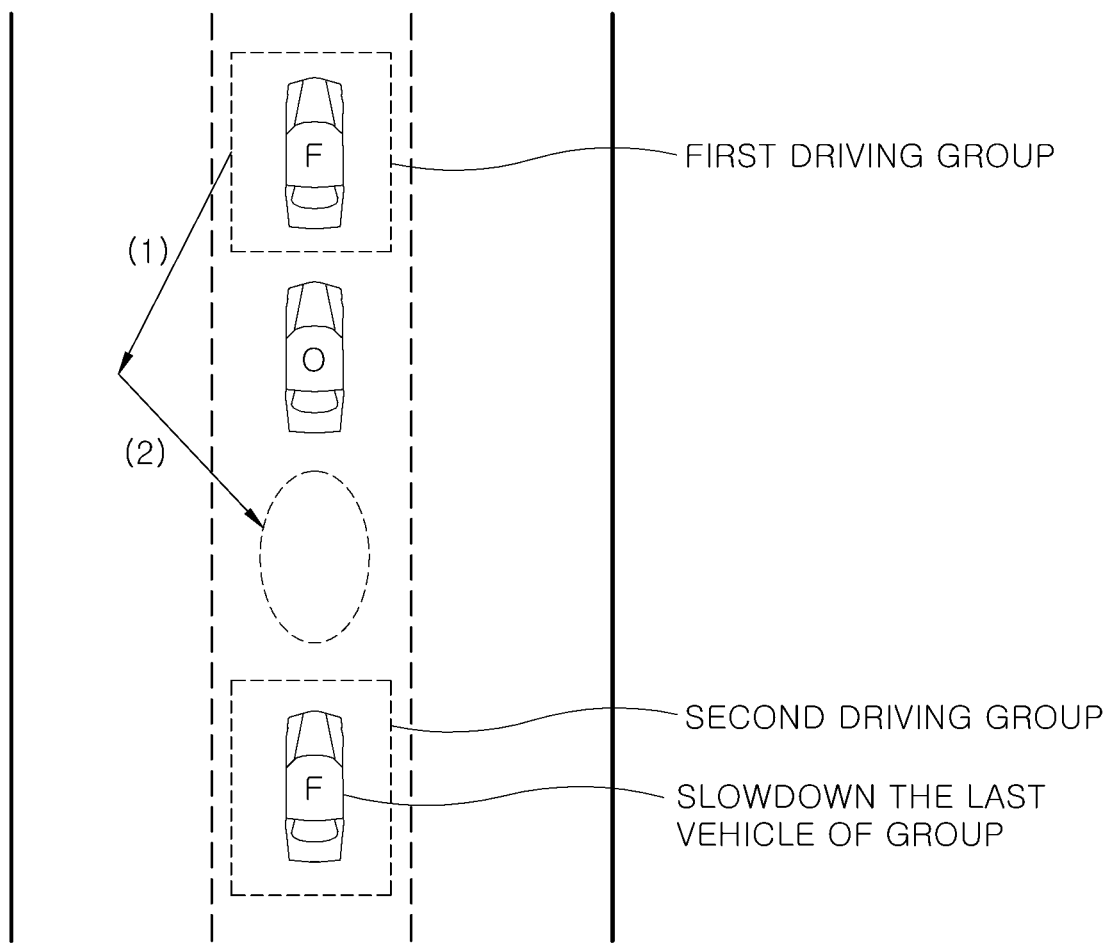

Referring to FIG. 8, the driving group is divided into two driving groups by the other vehicle. Since the number of group vehicle belonging to each of the forward and rearward driving groups is equal to one, the forward driving group becomes the first driving group and the rear driving group becomes the second driving group. The first group vehicle joins the second driving group so as not to disturb the driving of the other vehicle. At this time, the last group vehicle of the second group vehicle decelerates to secure a space with the preceding vehicle, and the first group vehicle joins the second driving group through the space.

On the other hand, when the first group vehicle joins the second driving group, the first group vehicle joins while maintaining the order according to the assigned identification code. Accordingly, in the process of joining the second driving group, the first group vehicle can maintain order, thereby preventing the vehicles from being deviated.

In the above description, two driving groups (i.e., the first driving group and the second driving group) among the plurality of driving groups separated from each other by the other vehicle in the driving group join each other.

On the other hand, this process is performed again until a plurality of driving groups form line.

Figure 9:
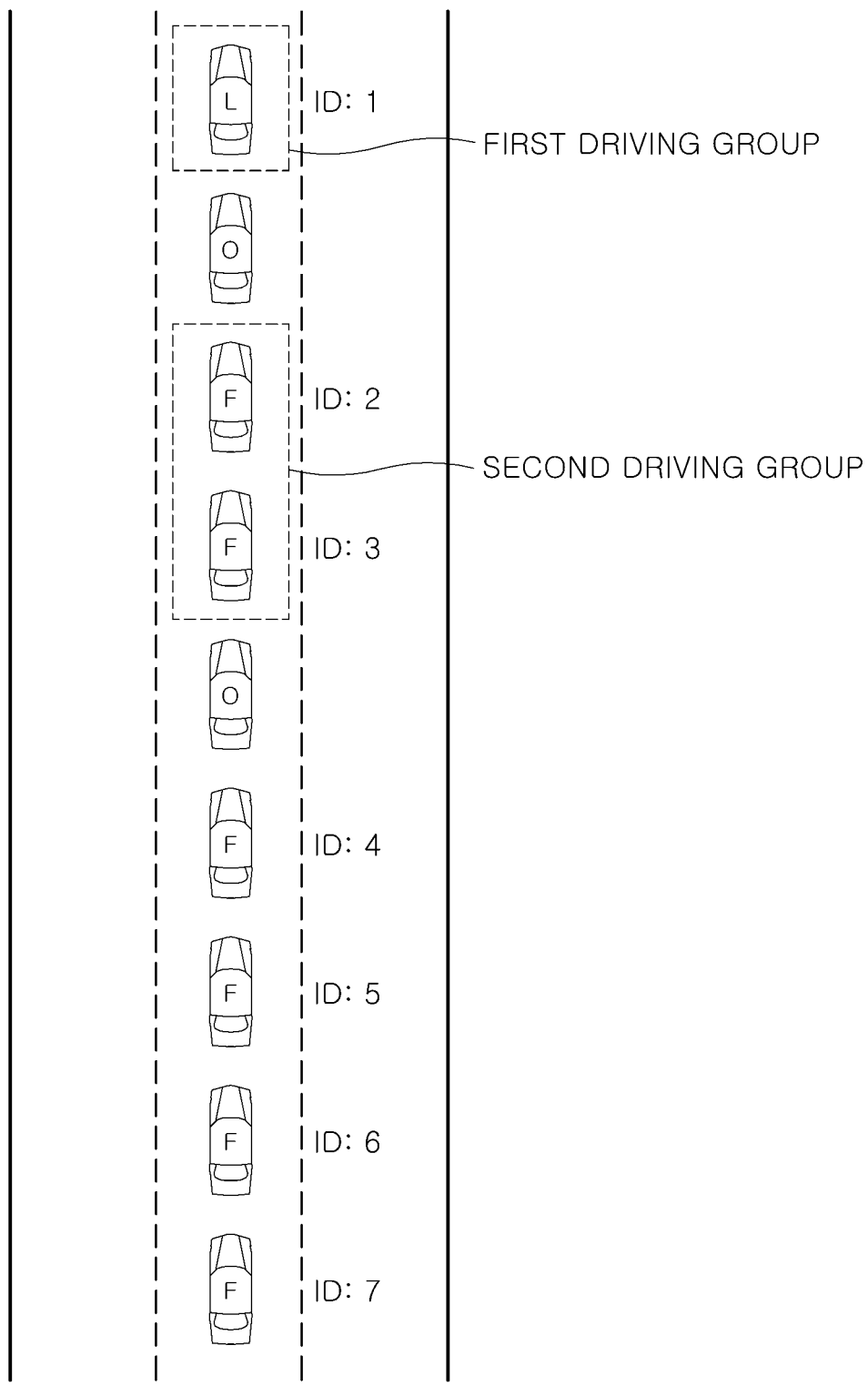
Figure 10:
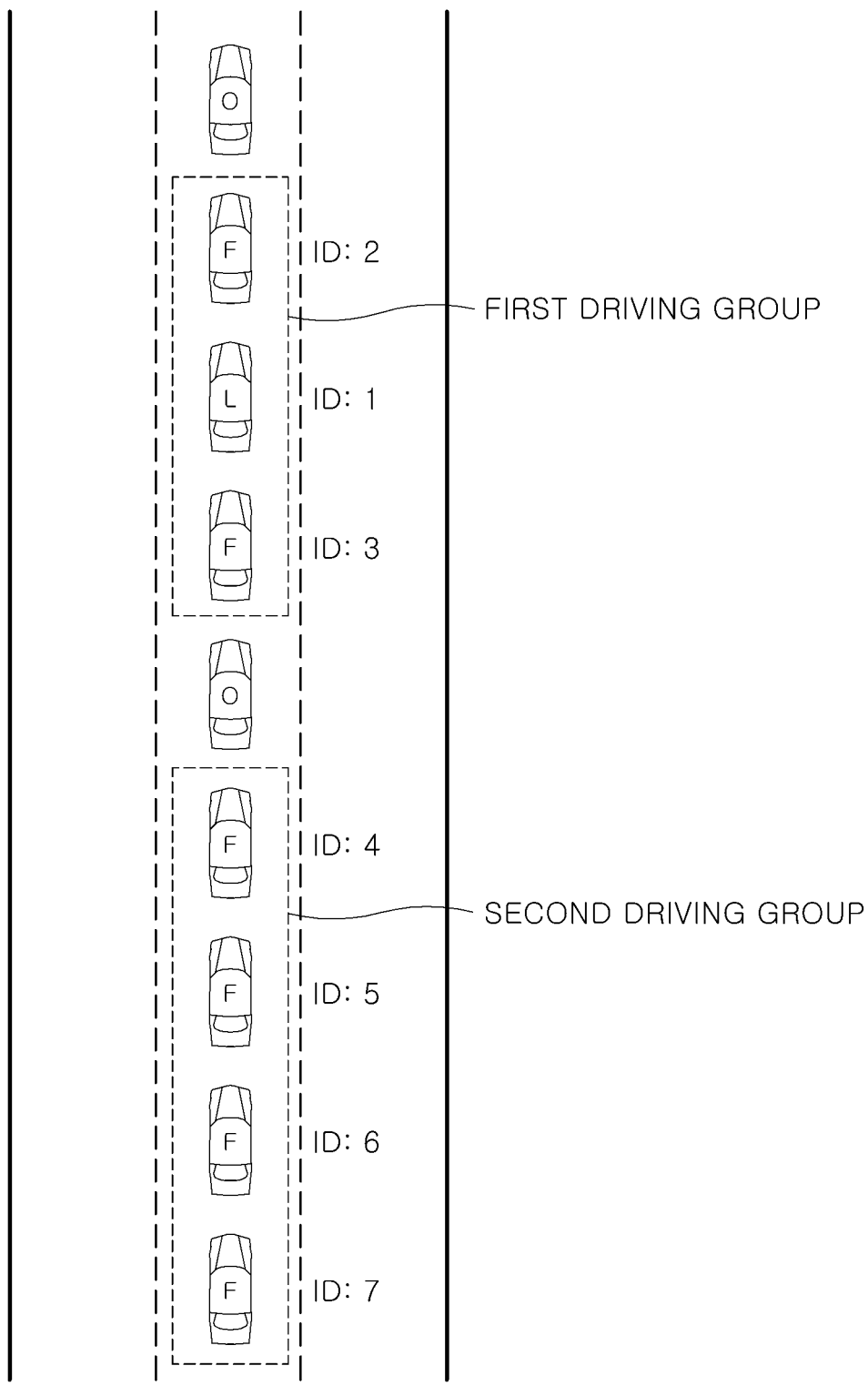
Figure 11:
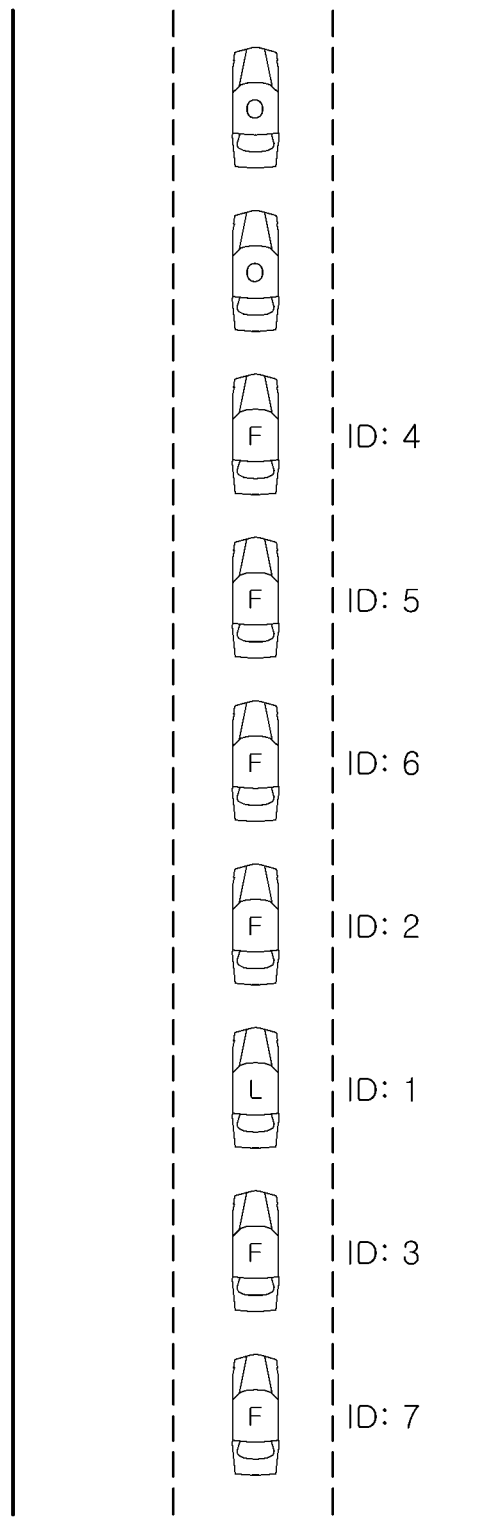

Referring to FIG. 9, the driving group is divided into three driving groups by other vehicles. The front-most driving group having the smallest number of the group vehicles becomes the first driving group. The intermediate driving group having a smaller number of group vehicles becomes the second driving group. Through the above-described process, the first group vehicles join to the second driving group, and the line as shown in FIG. 10 is formed. At this time, the above-mentioned process is again performed. The forward driving group having the smaller number of group vehicles becomes the first driving group, the rear driving group becomes the second driving group, and the first group vehicles join the second driving group. Through this process, a plurality of driving groups can form line.

As described above, in the present embodiment, when the group line are disturbed by other vehicles intervening in the driving group, the process of maintaining the group lines can be applied to prevent the group from being released. It is possible to improve the efficiency of the group driving by eliminating the priorities in advance.

In another embodiment of the present invention, the follow-up control unit 30 requests approval of joining the group driving group to the leader vehicle of the corresponding driving group by paying the fee for joining the driving group.

The follow-up control unit 30 controls the inter-vehicle communication unit 10 to request a destination of the driving group from the server or the leader vehicle of the driving group through the communication network.

When the destinations of the driving groups is transmitted through the communication network, the follow-up control unit 30 compares the destination of the vehicle detected by the navigation with the destinations of the driving groups to determine whether there is a driving group having the same destination as the destination of the vehicle. And the follow-up control unit 30 selects the corresponding driving group based on the determination result.

On the other hand, if there is no driving group having the same destination as the destination of the vehicle, the follow-up control unit 30 primarily selects the driving group which has the destination that is closest to the destination of the vehicle.

In this case, a plurality of groups may be selected as the primary selected driving group.

If the driving groups are selected based on the destination of the vehicle and the destinations of the driving groups, the follow-up control unit requests group driving information to the leader vehicles of the corresponding driving groups from the server or each of the leader vehicles of the primary selected driving groups.

The group driving information includes the vehicle information of the leader vehicle of the driving group and the cumulative distance of the leader vehicle, and the group driving information is basic information for securing the reliability of the leader vehicle of the corresponding driving group.

Here, the vehicle information of the leader vehicle may include a vehicle type, a sensor model, a camera model, the number of sensors, and the number of cameras.

The cumulative distance is the distance of the total distance traveled by the leader vehicle in group driving.

When the group driving information is transmitted, the follow-up control unit 30 finally determines the driving group by analyzing the group driving information.

Here, if there is one driving group that is primarily selected based on the destination of the vehicle and the destination of the driving group, the follow-up control unit 30 outputs the group driving information of the corresponding driving group through the user interface unit. The follow-up control unit 30 determines that the corresponding driving group is the final driving group to join.

In this case, the driver recognizes the group vehicle information and agrees with the final driving group determined by the follow-up control unit 30, or may abandon the joining to the driving group.

On the other hand, if there are a plurality of driving groups that are primarily selected based on the destination of the vehicle and the destinations of the driving groups, the follow-up control unit 30 outputs the group driving information of each of the driving groups through the user interface unit. The group driving information of each driving group is analyzed and one driving group is determined based on the analysis result.

In this case, the driver recognizes the group driving information of each driving group, agrees with the driving group determined by the follow-up control unit 30, or can arbitrarily select any one of the other driving groups. The follow-up control unit 30 finally determines the driving group according to the selection of the driver.

When the driving group is determined as described above, the follow-up control unit 30 determines a joining point to join the driving group based on the position of the vehicle.

For this, the follow-up control unit 30 detects the position of the vehicle through navigation, receives the group driving trajectory from the leader vehicle of the corresponding driving group, and determines a joining point according to the position of the vehicle and the group driving trajectory of the driving group In this case, a plurality of joining points may be searched according to the position of the vehicle and the group driving trajectory of the driving group.

When there are a plurality of joining points, the follow-up control unit 30 determines a joining point according to at least one of the distance from the position of the vehicle to the joining point, the traffic situation information of the joining point, the accident risk of the joining point and etc.

In some cases, the follow-up control unit 30 assigns weights to the distance from the position of the vehicle to the joining point, the traffic situation information at the joining point, the accident risk of the joining point, and the cost up to the joining point and determines one joining point based on the weighted factor.

The follow-up control unit 30 outputs the distance from the position of the vehicle to the joining point, the traffic situation information of the joining point, the accident risk of the joining point, and the cost up to the joining point through the user interface unit and outputs the joining point.

At this time, the driver can agree on the determined joining point, but without consent, the driver can select the joining point based on the distance from the position of the vehicle to the joining point, the traffic situation information of the joining point, the accident risk of the joining point. In this case, the follow-up control unit 30 finally determines the joining point according to the selection of the driver.

When the joining point is determined, the follow-up control unit 30 controls the autonomous drive unit 40 to drive the vehicle to the joining point.

After reaching the joining point, when the vehicle arrives within a range in which short distance communication with the leader vehicle of the driving group is available, the follow-up control unit 30 pays a fee for the group driving for approval of joining.

The follow-up control unit 30 joins the tail of the corresponding driving group in an autonomous driving mode when the vehicle is capable of autonomous driving, or joins the vehicle to a position in the driving group according to the driver's selection.

On the other hand, if the autonomous driving is not possible, the follow-up control unit 30 controls the user interface unit to select either the manual joining method or the automatic joining method.

At this time, when the manual merge mode is selected, the vehicle is driven according to the driver's action and joins the group driving. The follow-up control unit 30 turns on a driving assistance function such as SCC (Smart Cruise Control), LKA (Lane Keeping Assistance) and ACC (Auto Cruise Control).

On the other hand, if the automatic joining mode is selected, the follow-up control unit 30 controls the autonomous drive unit 40 to turn on the driving assistance function and drive the semi-autonomous driving to joining into the last position in the group.

On the other hand, if the vehicle joins the driving group as described above, the follow-up control unit 30 determines the point of deviating.

In the case, there are a plurality of points of deviating, the follow-up control unit 30 controls the navigation to select one point of deviating according to geographical position, road structure, etc.

The follow-up control unit 30 controls the navigation while the vehicle is driving so as to check whether the vehicle arrives within the set distance from the point of deviating or within the set time from the estimated time to arrive at the point of deviating.

In this case, when the vehicle arrives within the set distance from the point of deviating or within the set time from the estimated time to arrive at the point of deviating, the follow-up control unit 30 guides the arrival at the point of deviating via the user interface unit. And the follow-up control unit 30 allows the vehicle to leave from the group driving.

Meanwhile, in the above process, when the vehicle joins or deviates the driving group, and the speeding vehicle or the danger obstacle exists, the follow-up control unit 30 may limit the joining or deviating of the vehicle.

In this embodiment, a driving group that is best suited to the driving state of the vehicle is selected from among the plurality of the driving groups, so that they can join or deviate the corresponding driving group.

In addition, the navigation system, smart phone, V2X and etc are used to provide various options to the driver when selecting a group driving, and safety and it allows convenience of the vehicle can be ensured by taking into account various driving situations when joining or deviating the group.

In addition, by allowing the leader vehicle of the group driving group to follow other lanes, it is possible to minimize the distance between the vehicle and the leader vehicle, thereby increasing the efficiency of the road and improving the followability to the leader vehicle.

Although preferred embodiments of the invention have been disclosed for illustrative purposes, those skilled in the art will appreciate that various modifications, additions and substitutions are possible, without departing from the scope and spirit of the invention as defined in the accompanying claims. Accordingly, the true scope of the present invention should be determined by the following claims.

What is claimed is:

1. An apparatus for controlling group driving of a driving group comprising vehicles, the apparatus comprising:
    an inter-vehicle communication unit configured to communicate with a leader vehicle of the vehicles to receive the driving state and traveling track of the leader vehicle;
    a leader vehicle learning unit configure to learn a driving pattern of the leader vehicle based on the driving state of the leader vehicle received through the inter-vehicle communication unit;
    an autonomous drive unit configured to autonomously drive a follower vehicle of the vehicles in accordance with the traveling track of the leader vehicle; and
    a follow-up control unit configured to
        control the autonomous drive unit to follow the traveling track of the leader vehicle by applying the driving pattern of the leader vehicle,
        provide an identification code (ID) for each of the vehicles of the driving group, in response to another vehicle intervening in the driving group, and
        maintain an order of the vehicles in the driving group to exclude the another vehicle based on the ID for each of the vehicles.

2. The apparatus of claim 1, further comprising:
    a storage configured to store the driving state and the traveling track of the leader vehicle received from the leader vehicle and the driving pattern of the leader vehicle.

3. The apparatus of claim 1, wherein the driving state of the leader vehicle comprises any one or any combination of lane change timing, an entry steer angle, and an entry speed in accordance with type and situation of the road in the leader vehicle.

4. The apparatus of claim 1, wherein the follow-up control unit is further configured to perform autonomous driving to join the follower vehicle in the driving group by applying the driving pattern of the leader vehicle, in response to the follower vehicle deviating from the group driving.

5. A method of controlling group driving of vehicles in a driving group, the method comprising:
    performing, by a follow-up control unit, group driving through an autonomous drive unit according to a traveling track received from a leader vehicle of the vehicles;
    receiving, by the follow-up control unit, a driving state of the leader vehicle from the leader vehicle during the group driving to learn a driving pattern of the leader vehicle;
    performing, by the follow-up control unit, autonomous driving by applying the driving pattern of the leader vehicle;
    providing an identification code (ID) for each of the vehicles of the driving group, in response to another vehicle intervening in the driving group; and
    maintain an order of the vehicles in the driving group to exclude the another vehicle based on the ID for each of the vehicles.

6. The method of claim 5, wherein the driving state of the leader vehicle comprises any one or any combination of lane change timing, an entry steer angle and an entry speed in accordance with the type and situation of the road in the leader vehicle.

7. The method of claim 5, further comprising:
    storing, by the follow-up control unit, the traveling track and the driving state of the leader vehicle received from the leader vehicle and the driving pattern of the leader vehicle in a storage.

8. The method of claim 5, wherein the performing of the autonomous driving comprises performing the autonomous driving to join the follower vehicle in the driving group by applying the driving pattern of the leader vehicle, in response to the follower vehicle deviating form the driving group.

9. The apparatus of claim 1, wherein the (ID) for each vehicle of the driving group has a sequential value according to a distance from the leader vehicle.

10. The apparatus of claim 1, wherein the follow-up control unit is further configured to
    divide the driving group into two or more driving groups based on the ID for each of the vehicle and a position of the another vehicle; and
    maintain an order of the vehicles based on adjusting a speed of at least one vehicle of the vehicles to combine the two or more driving groups.

* * * * *